(12) United States Patent
Sahin et al.

(10) Patent No.: US 12,245,611 B2
(45) Date of Patent: Mar. 11, 2025

(54) CORNET CONE PRODUCTION METHOD

(71) Applicant: Mondi Kale Nobel Ambalaj Sanayi Ve Ticaret Anonim Sirketi, Kirklareli (TR)

(72) Inventors: Umit Sahin, Kirklareli (TR); Osman Kadiroglu, Kirklareli (TR)

( * ) Notice: Subject to any disclaimer, the term of this patent is extended or adjusted under 35 U.S.C. 154(b) by 149 days.

(21) Appl. No.: 17/771,306

(22) PCT Filed: Dec. 23, 2019

(86) PCT No.: PCT/TR2019/051185
§ 371 (c)(1),
(2) Date: Apr. 22, 2022

(87) PCT Pub. No.: WO2021/107889
PCT Pub. Date: Jun. 3, 2021

(65) Prior Publication Data
US 2022/0378063 A1    Dec. 1, 2022

(30) Foreign Application Priority Data

Nov. 29, 2019  (TR) ................................. 2019/18842

(51) Int. Cl.
*B31C 7/08*   (2006.01)
*A23G 9/50*   (2006.01)

(52) U.S. Cl.
CPC ................ *A23G 9/503* (2013.01); *B31C 7/08* (2013.01)

(58) Field of Classification Search
CPC ........................................................ B31C 7/08
See application file for complete search history.

(56) References Cited

U.S. PATENT DOCUMENTS

| | | | |
|---|---|---|---|
| 6,200,406 B1* | 3/2001 | Ito | B31B 50/00 156/250 |
| 2020/0016861 A1* | 1/2020 | Sahin | B31B 70/30 |
| 2021/0221555 A1* | 7/2021 | Sahin | B65D 85/78 |
| 2023/0002094 A1* | 1/2023 | Sahin | B31C 11/00 |

FOREIGN PATENT DOCUMENTS

| | | |
|---|---|---|
| EP | 2266894 B1 | 12/2012 |
| GB | 1159588 A | 7/1969 |
| JP | S53101072 A | 9/1978 |
| JP | 2005255243 A | 9/2005 |
| JP | 2012192953 A | 10/2012 |
| TR | 2017/00278 A1 | 1/2017 |
| TR | 2018/13006 A1 | 9/2019 |

OTHER PUBLICATIONS

International Search Report for corresponding PCT/TR2019/051185, dated Oct. 6, 2021.
Written Opinion of the International Searching Authority for corresponding PCT/TR2019/051185, dated Oct. 6, 2021.

* cited by examiner

*Primary Examiner* — Praachi M Pathak
(74) *Attorney, Agent, or Firm* — Egbert, McDaniel & Swartz, PLLC

(57) ABSTRACT

Disclosed is a production method developed for production of cornet cones with less waste from plain cornet paper in a roll.

2 Claims, 2 Drawing Sheets

CORNET CONE PRODUCTION METHOD

TECHNICAL FIELD

The invention relates to cornet cone packages containing ice cream in it.

In particular, the invention relates to a production method developed for making production of cornet cone with at least wastage from plain cornet paper in roll.

The State of the Art

Today, the cornet cone packages are used to present ice creams to consumers. At present, cornet cone packages are produced by cutting the plain cornet papers, throwing away the wastage portions of it and crimping it in the cone shape. However, due to the fact that the cutting geometries are different in the present production methods, a significant amount of wastage occurs after cutting. Therefore, as the wastage amount increases, the production cost also increases.

It is not also possible to reuse the resulting wastages in the production of cornet cones.

Since flanges, projections, etc. are not formed on the available cornet cone packages, it is difficult to open the overlapping portions after the cornet cone is crimped in the shape of cone. The consumer tries to tear the cornet cone from different regions to open it and this situation forces the consumer highly.

A patent application similar to the production method of the cornet cone according to the invention has not been found. Nevertheless, some patents prepared in the same technical field are referred to below.

EP2266894B1 publication numbered European Patent relates to the package for cornet ice cream. An unprocessed piece was provided for forming a cone package suitable for packaging the cornet ice cream products; The unprocessed piece has an upper edge being at least partially curved, two side edges and at least one circumferential weakness line positioned generally at 1 mm to 30 mm from the upper edge of the unprocessed piece and in parallel with it; wherein it has numerous non-circumferential weakness lines between at least one circumferential weakness line and upper edge. Also a cone package composed of unprocessed piece and a packaged product containing cone package, a lid and frozen confectionery were provided. However, the related patent does not disclose the steps of production method according to the invention.

Another patent application numbered TR2017/00278 belonging to the applicant firm relates to windowed cornet package provided with cornet package in which the ice cream prepared from all kinds of dried and fresh fruit according to consumer preference is placed; wherein it contains window placed on said cornet package and transparent barrier connected with said window.

Another patent application numbered TR2018/13006 belonging to the applicant firm relates to cone-shaped easy-to-tear cornet package, which is used in packaging the cornet type ice creams having cone-shaped cornets. The characteristic of the invention is that after withdrawing of retaining protrusion formed between upper curve and lower curve formed in an inward form on the outer edge line forming the opening section, the cornet package is easily separated from the ice cream cone with the right and wide area tearing of upper tearing line and lower tearing line in concave form.

Consequently, the existence of problems with the production methods of cornet cone and the inadequacy of the existing solutions necessitated an improvement in the relevant technical field.

The Objects of the Invention

The main object of the invention is to develop a production method for making production of a cornet cone with at least wastage from plain cornet paper in roll.

Another object of the invention is to provide minimum wastage resulting after cutting the plain cornet paper in roll by using blade patterns having optimum cutting geometries on rotating roller and to reduce production cost.

Another object of the invention is to enable the cone-shaped cornet package to be easily opened by forming a projection-shape flange at the desired region on the packaging paper after the cutting process during the production of the cornet cone package.

REFERENCE NUMBERS

Figure 1:
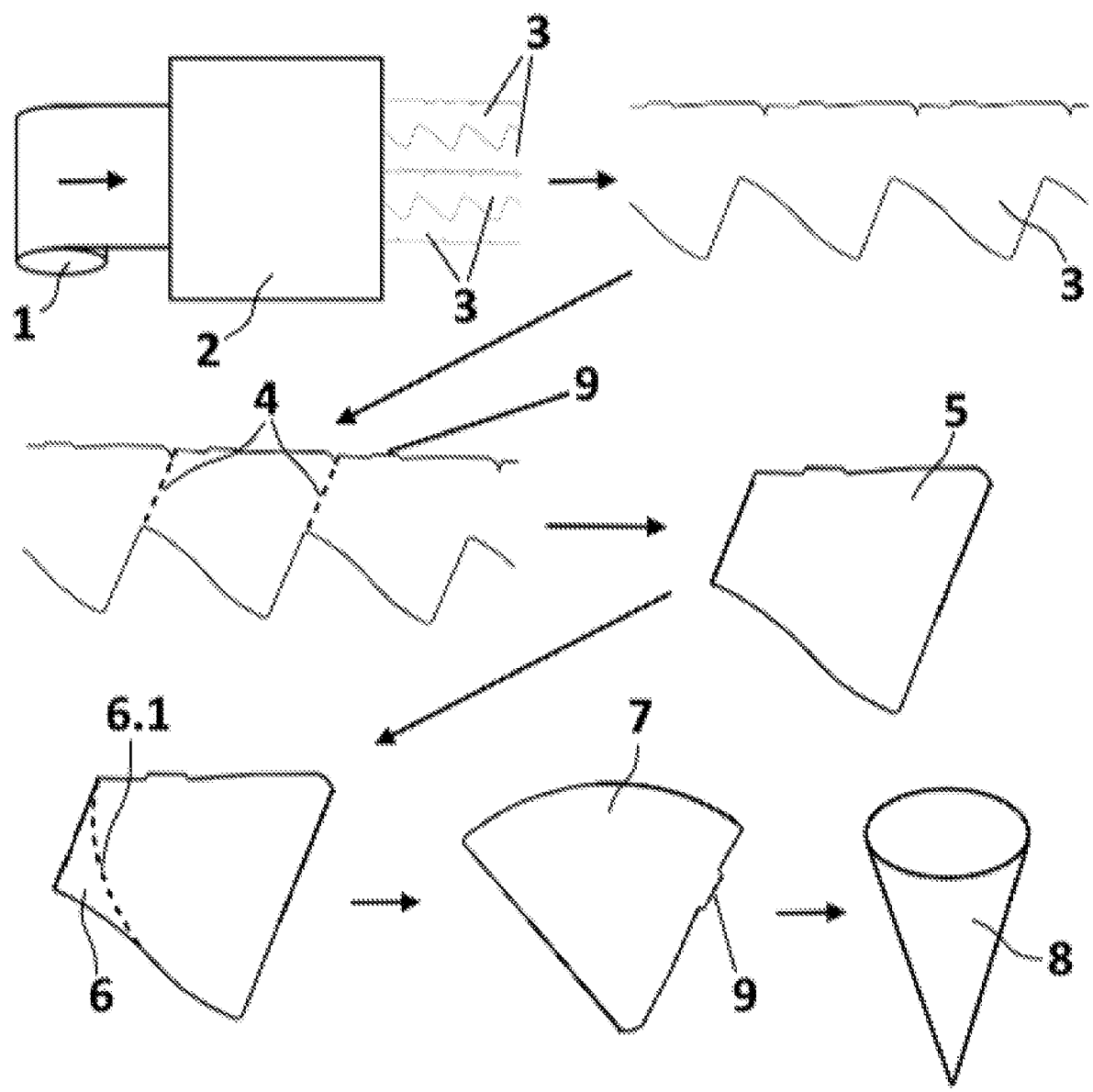
FIG. 1 is a schematic drawing illustrating the production method of the cornet cone according to the invention.
Figure 2:
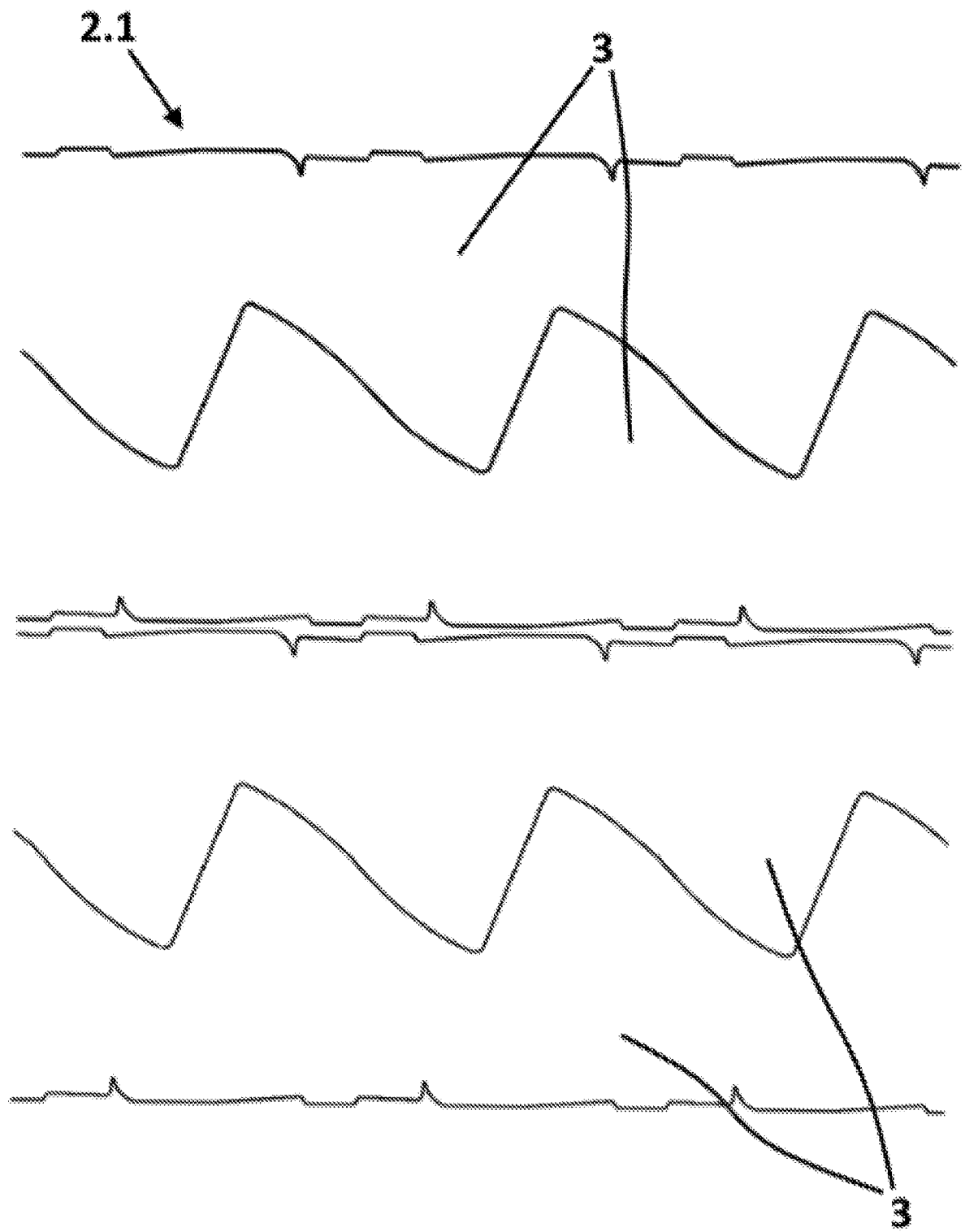
FIG. 2 is a schematic drawing of blade patterns on the rotating roller.

1. Plain cornet package roller
2. Rotating roller
   2.1. Blade pattern
3. Roller strip
4. Cutting line
5. Package form from cutting
6. Wastage region
   6.1. Wastage cutting line
7. Last form before the crimping process
8. Cornet cone
9. Flange

DETAILED DESCRIPTION OF THE INVENTION

The invention relates to a production method developed for making production of cornet cone with at least wastage from plain cornet paper in roll (1).

The method according to the invention involves the following steps, respectively.

a) Firstly, the plain package paper opened from plain cornet package roller (1) is cut into four roller strips (3) in accordance with the geometry of the blade patterns (2.1) of the rotating roller (2) by passing it over (under) a rotating roller (2). After cutting, four roller strips (3) of the same geometry are obtained. The numbers of simultaneously cut roller strip (3) can be changed optionally and as required. Thanks to the geometry of the blade patterns (2.1), at least one flange (9) is formed on the roller strips (3) at the desired intervals after the cutting process. By means of the flanges (9), opening of the cornet cone package is facilitated from the point of consumer.

b) The roller strips from cutting (3) is cut from the cutting lines (4) via a cutting machine and the package form from cutting (5) is obtained.

c) The wastage regions (6) are shaved along the wastage cutting line (6.1) by carrying out the shaving process on the package form from cutting (5) and the last form before the crimping process (7) is obtained.

d) Finally, the last form cornet cone (8) is obtained by performing the crimping process on the last form before the crimping process (7) via the crimping machine.

Thanks to the production method according to the invention, it was provided that minimum wastage after cutting the plain cornet paper in roller occurs by using blade patterns having optimum cutting geometries on rotating roller (2) and the production costs are reduced.

Also, during the production of cornet cone package, it was enabled that the cone-shaped cornet package can be easily opened by forming a projection-shape flange (9) at the desired region on the packaging paper after the cutting process.

The invention claimed is:

1. A method for producing a cornet cone, the method comprising:
   opening a package paper by a cornet package roller;
   cutting the opened package paper into at least two roller strips, the at least two roller strips being formed simultaneously and having identical geometries conforming to a geometry of blade patterns of a rotating roller, the opened package paper passing over or under the rotating roller;
   cutting the at least two roller strips so as to obtain a plurality of package forms from the at least two roller strips;
   shaving wastage regions from each of the package forms of the plurality of package forms; and
   crimping a package form of the plurality of package forms so as to form the cornet cone.

2. The method of claim 1, the step of cutting the opened paper into at least two roller strips comprising:
   forming at least one flange on the at least two roller strips, wherein a geometry of the at least one flange conforms to the geometry of the blade patterns of the rotating roller.

* * * * *